No. 871,855. PATENTED NOV. 26, 1907.
O. S. BEYER.
SEAMING MACHINE.
APPLICATION FILED DEC. 26, 1903.
11 SHEETS—SHEET 4.
Fig. 9.
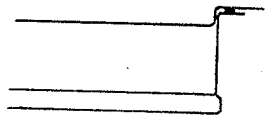
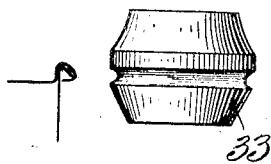
Fig. 10.
33
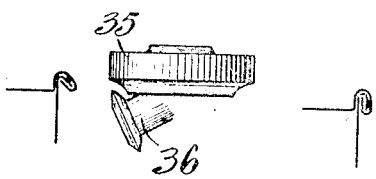
Fig. 11.
35
36
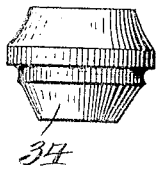
Fig. 12.
34
Fig. 13.
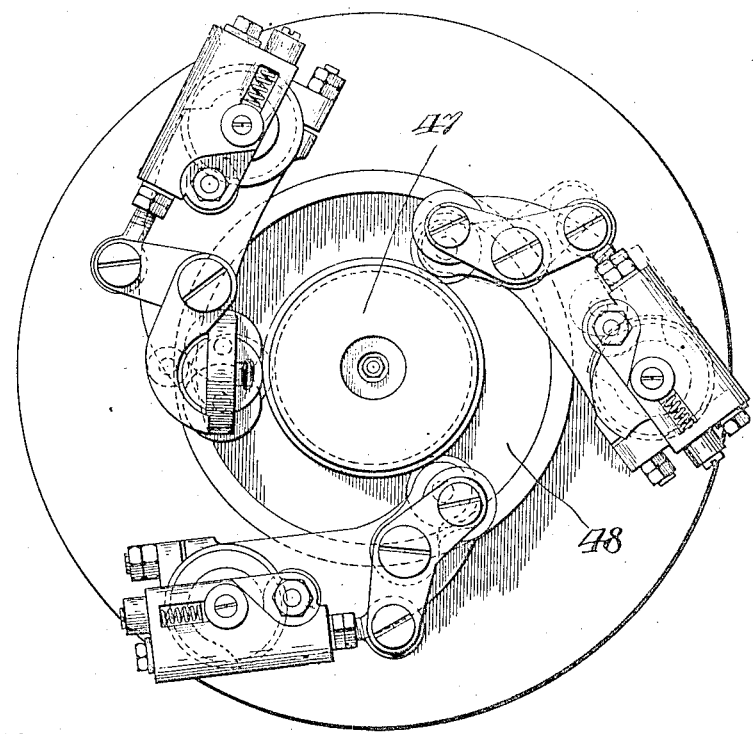
Witnesses
Edgworth Greene
Carl A. Kroll
Inventor
Otto S. Beyer
By his Attorneys
Becker & Spaulding No. 871,855. PATENTED NOV. 26, 1907.
O. S. BEYER.
SEAMING MACHINE.
APPLICATION FILED DEC. 26, 1903.
11 SHEETS—SHEET 5.
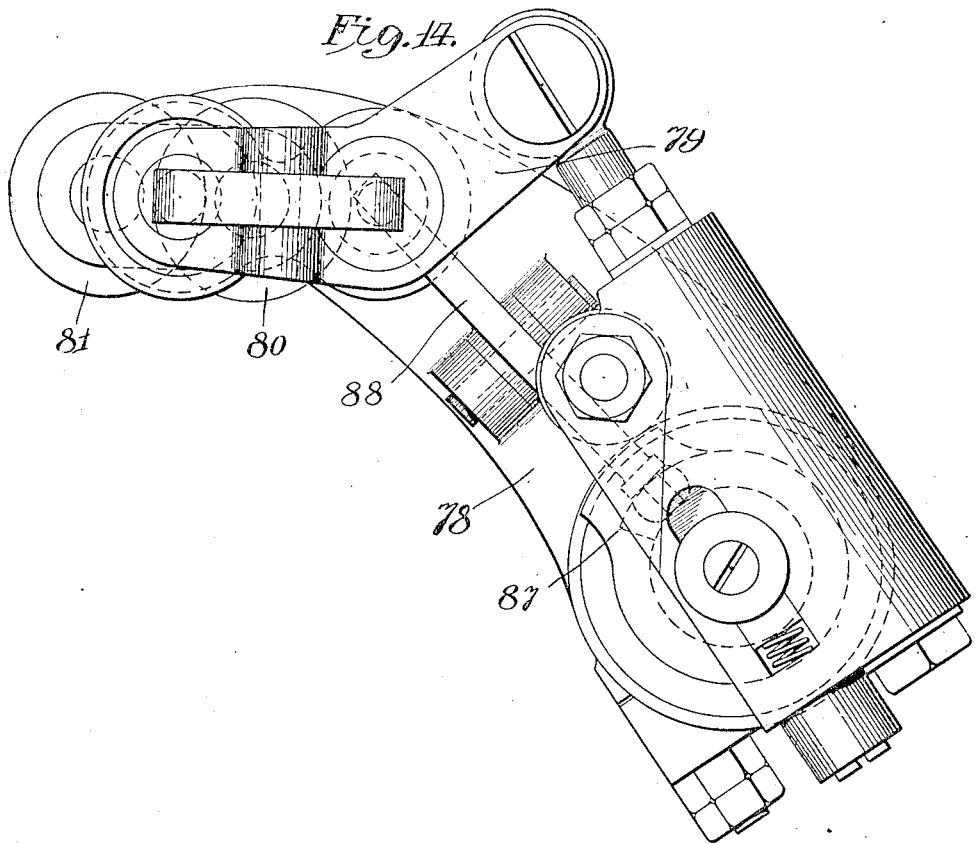
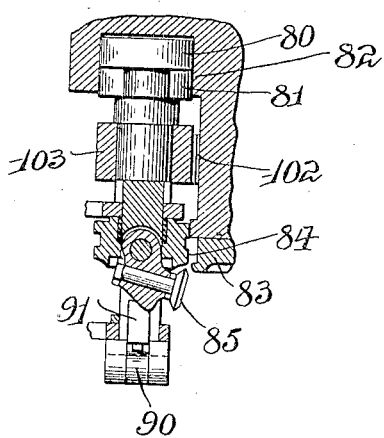
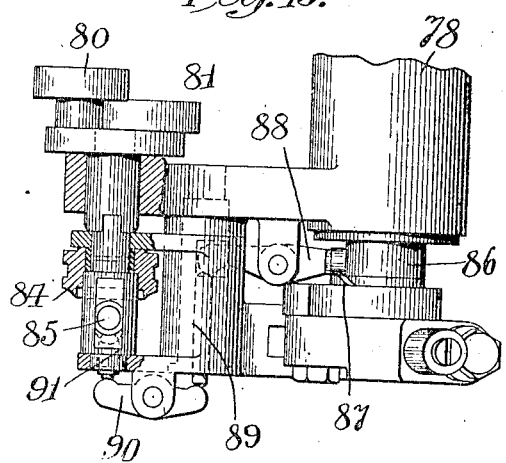

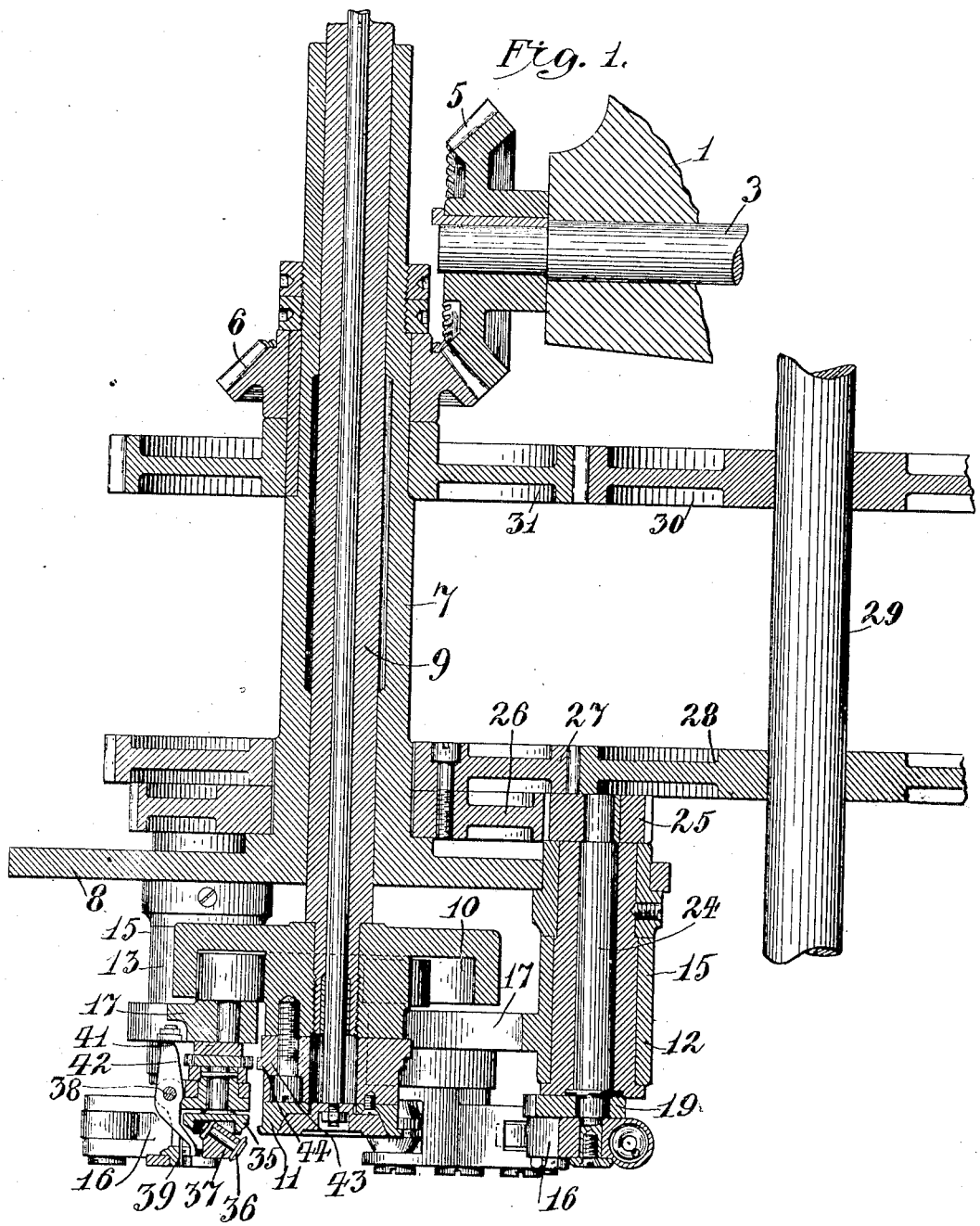

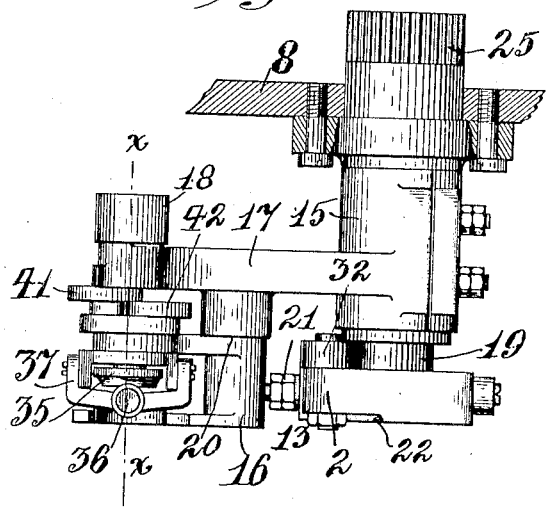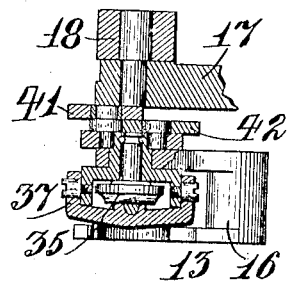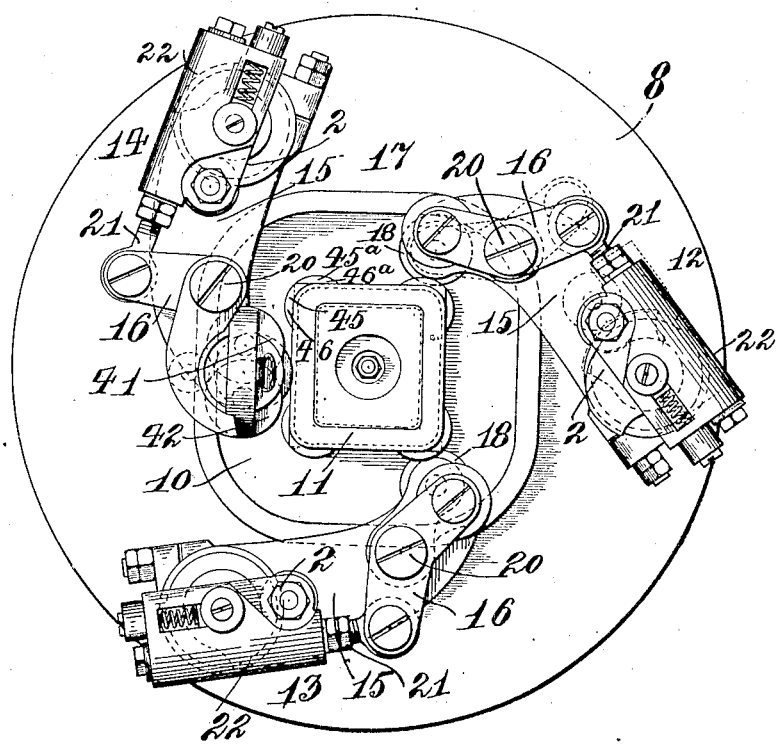

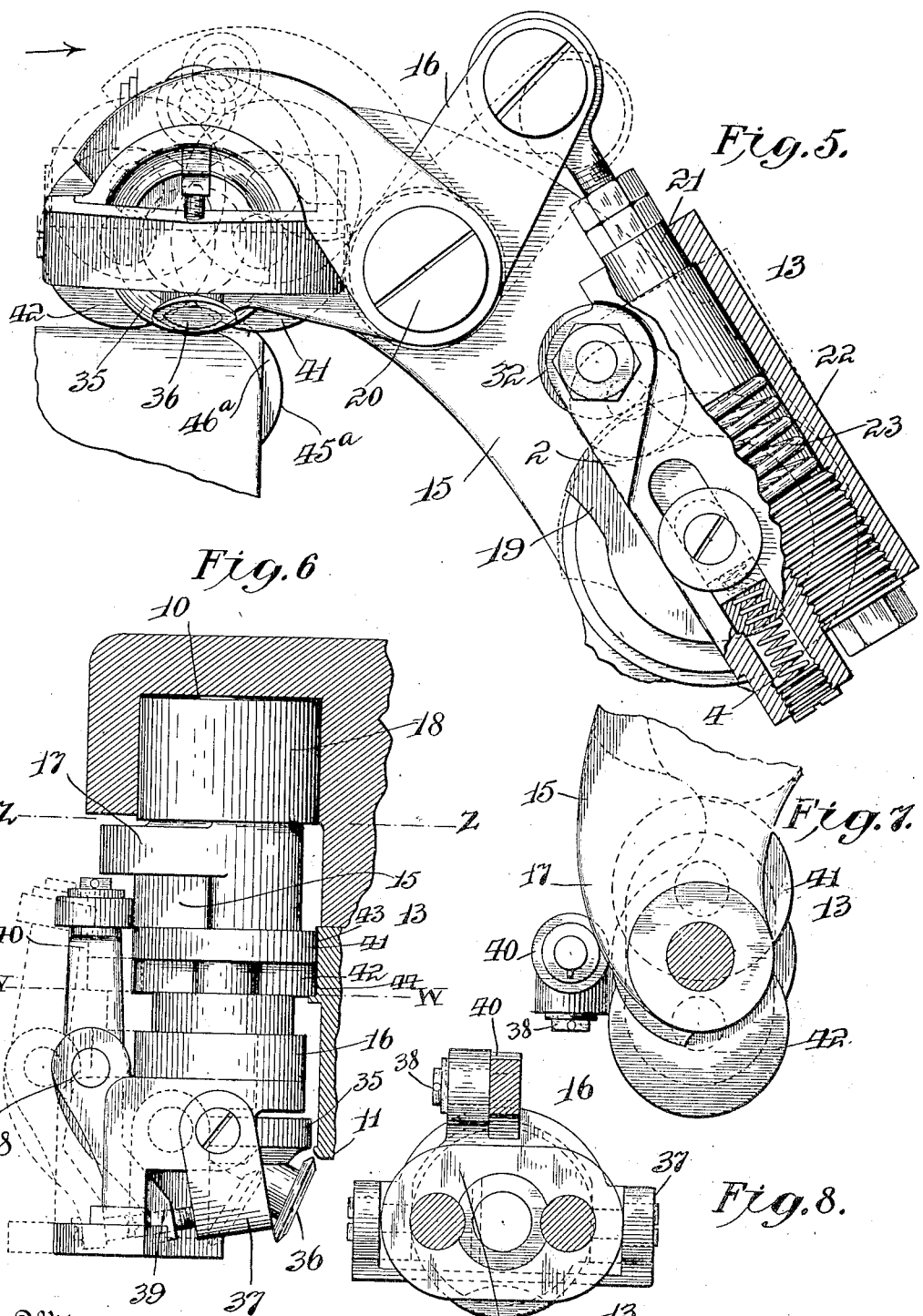

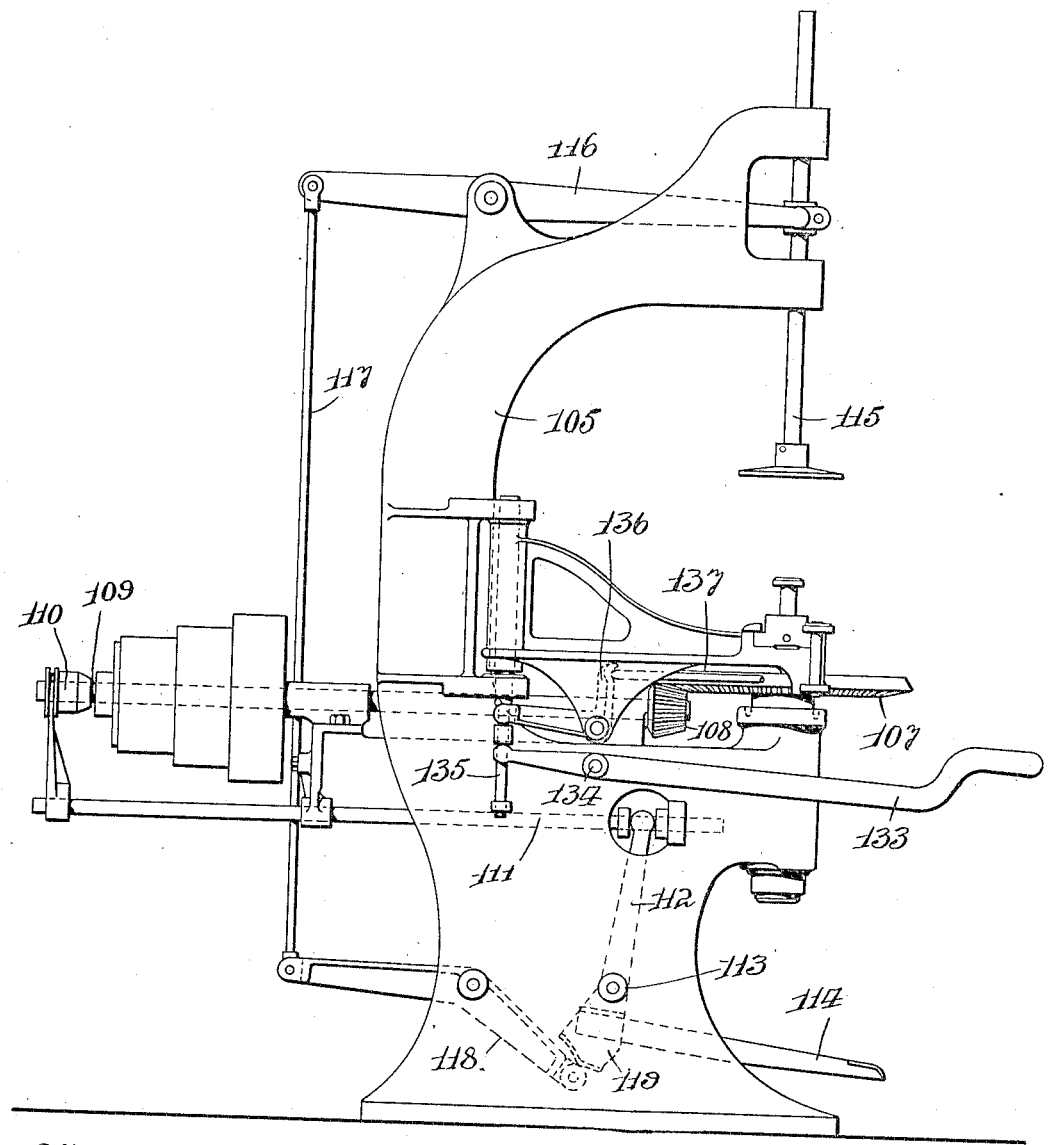

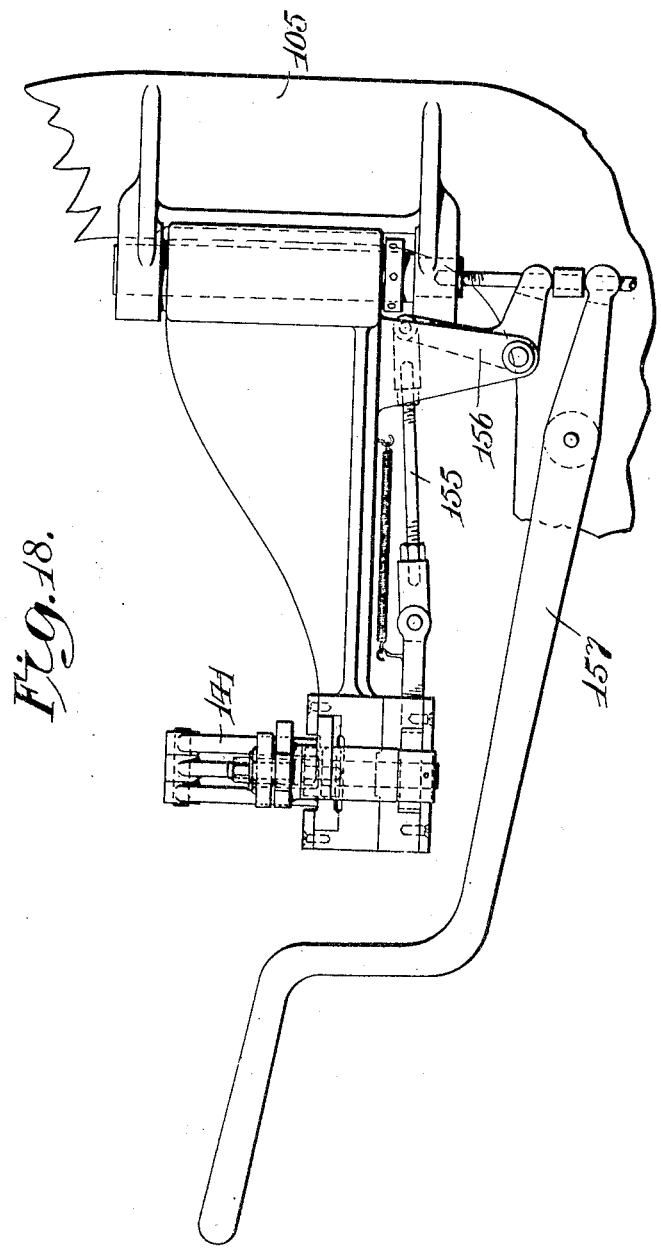

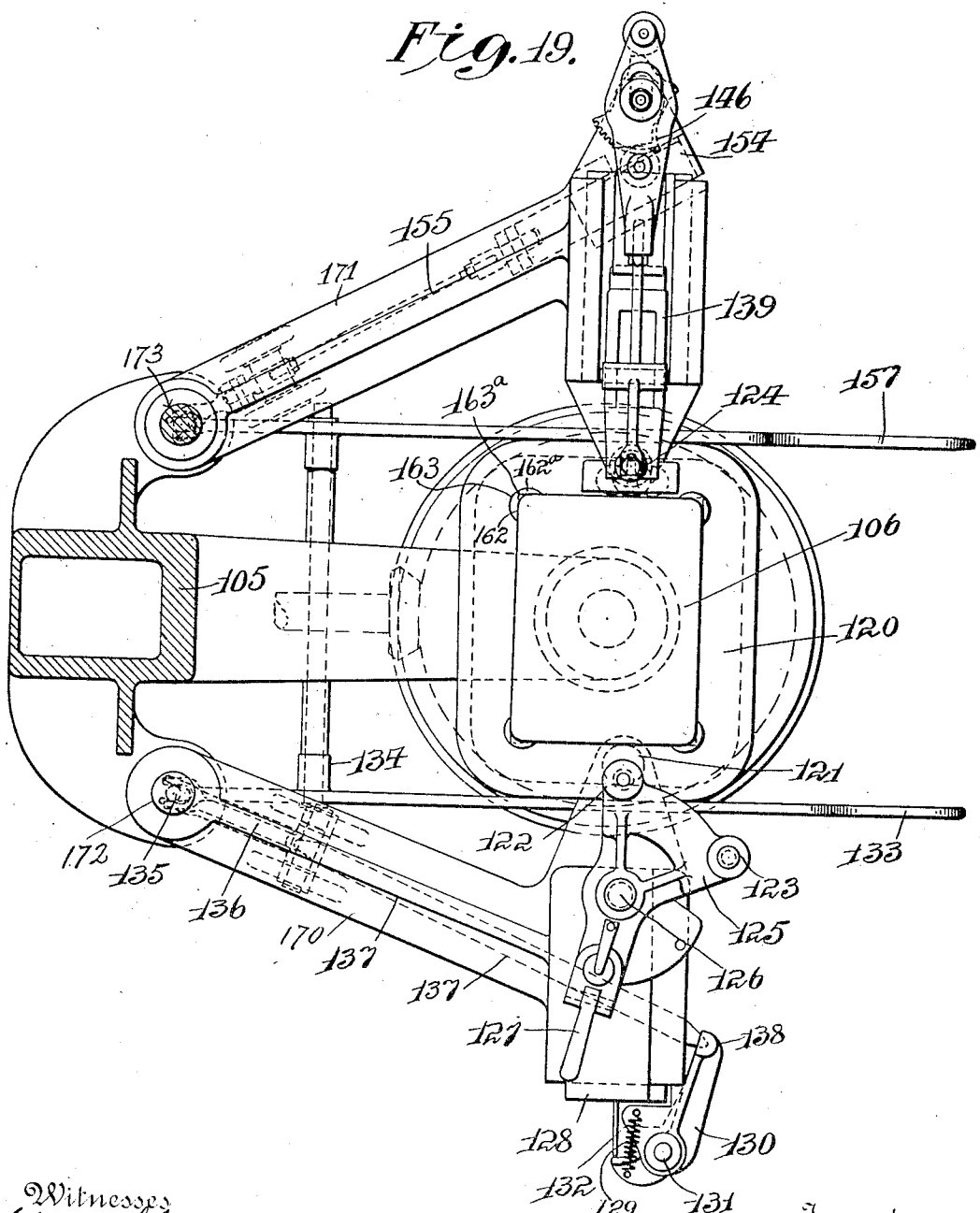

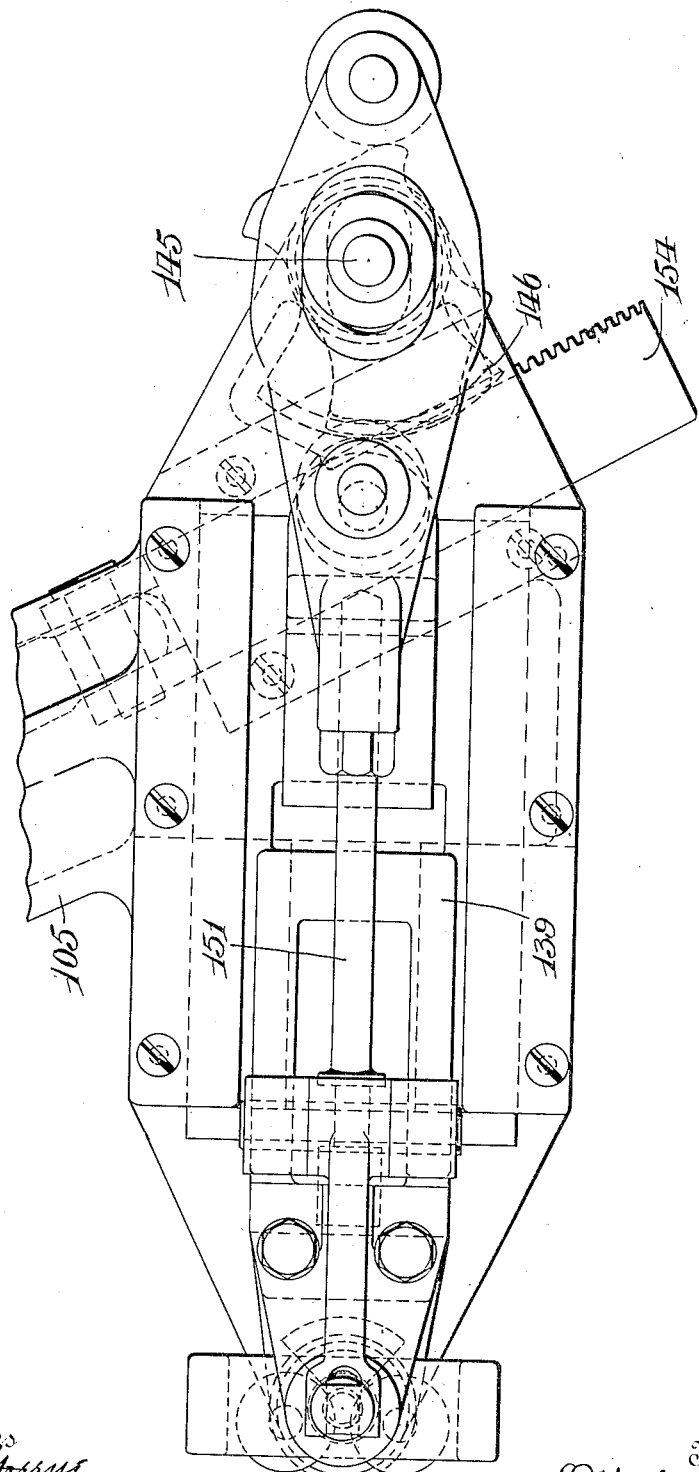

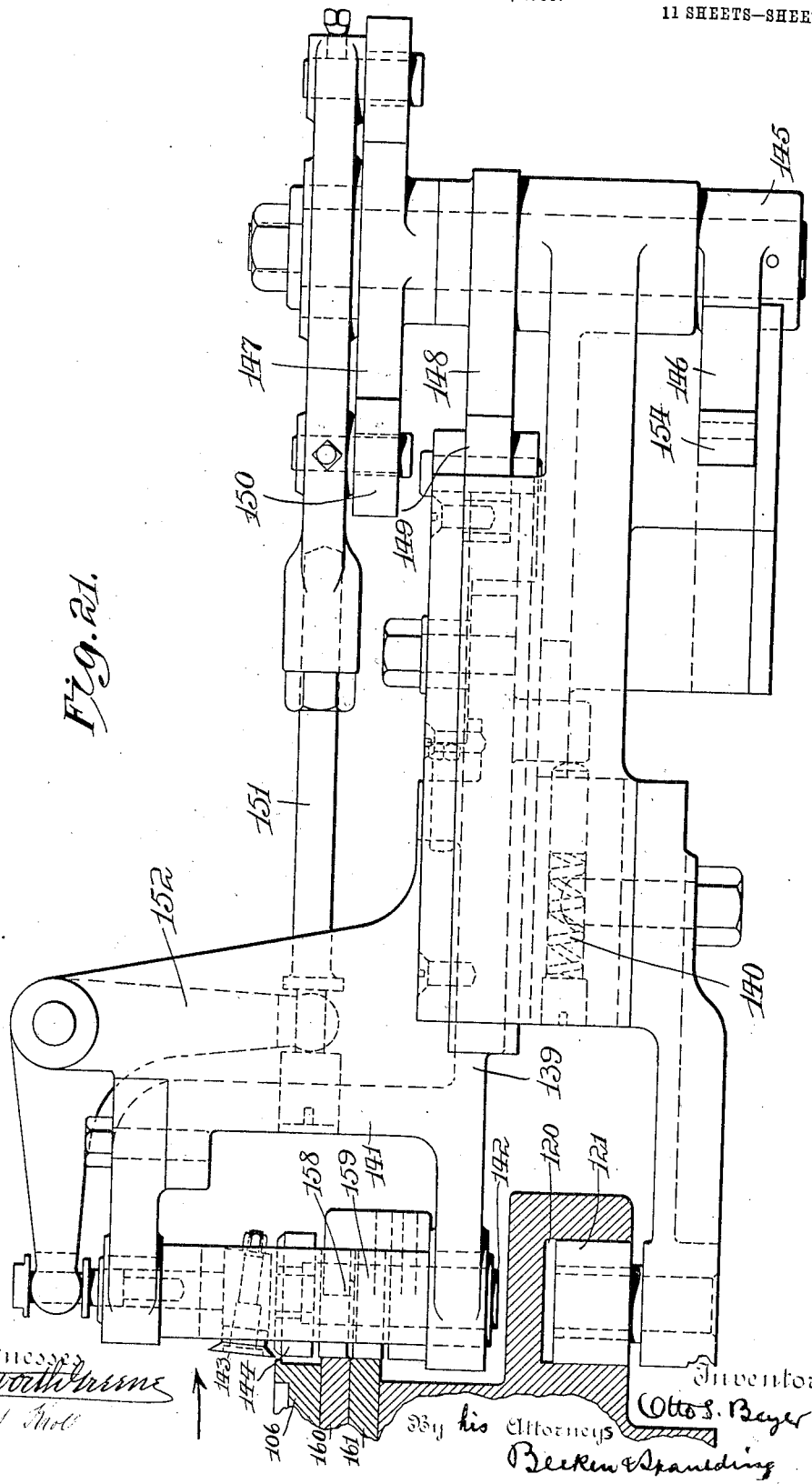

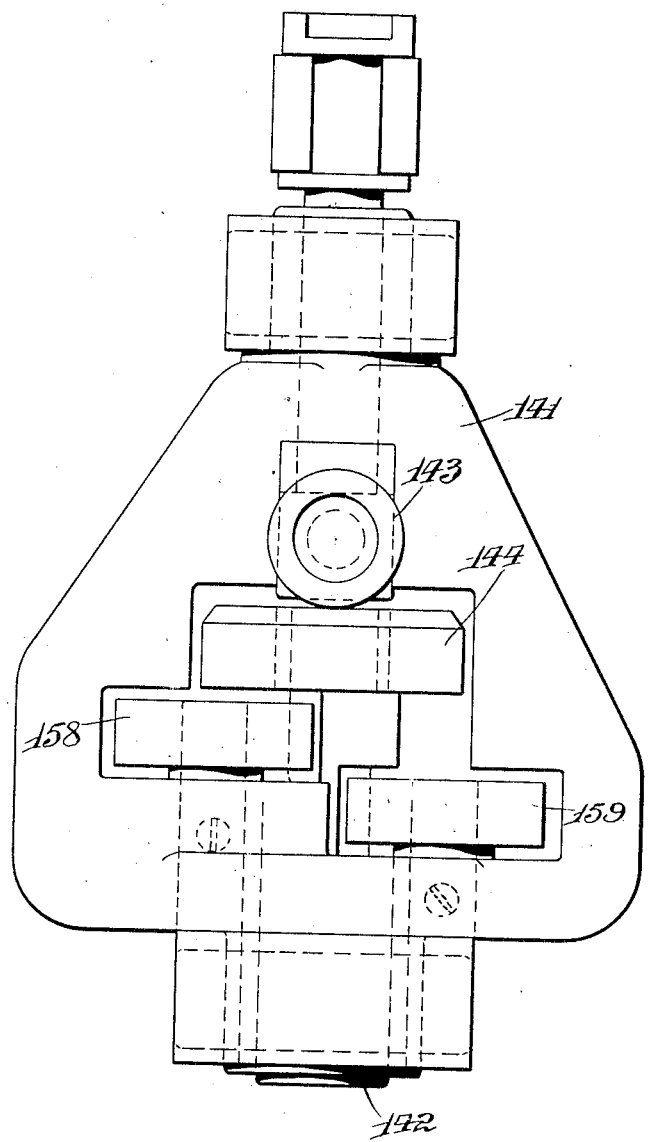

UNITED STATES PATENT OFFICE.

OTTO S. BEYER, OF EAST RUTHERFORD, NEW JERSEY, ASSIGNOR TO E. W. BLISS COMPANY, A CORPORATION OF WEST VIRGINIA.

SEAMING-MACHINE.

No. 871,855.  Specification of Letters Patent.  Patented Nov. 26, 1907.

Application filed December 26, 1903. Serial No. 186,603.

*To all whom it may concern:*

Be it known that I, OTTO S. BEYER, a citizen of the United States of America, and a resident of East Rutherford, county of Bergen, and State of New Jersey, have invented certain new and useful Improvements in Seaming-Machines, of which the following is a specification.

My invention relates generally to seaming machines for joining the ends or heads of cans to the body of the same, and has more particular reference to double seaming machines.

The heads of cans or other containing vessels are variously formed, and my machine, while capable of seaming the several styles known in the art, is especially designed to seam a can with a certain style of head, a style produced by the exigencies of trade, as will be understood from the following: When shipping cans to the packer, one end or head of the can is shipped separately. In order to get a tight joint it has been found useful to provide the flange of the head, which is generally straight horizontally with a rubber ring or with a ring of paste or paint. During the shipment above referred to, this ring is frequently injured and for that reason the said flange of the head is now usually turned down at its outer edge or "burred" so as to protect the rubber ring. To properly seam a can with a style of head of this character requires a three step operation or the action of three seaming members, one member of which consists of two opposed conical deflecting rolls.

In an application for Letters Patent of the United States, filed on the 9th day of January, 1903, Ser. No. 138,346, I have shown a machine for seaming circular cans embodying a construction in which the work to be acted upon rotates and the seaming members are relatively stationary.

In a companion application filed on the fifth day of June 1906, Serial No. 320,228, I have shown a machine in which the work to be acted upon is relatively stationary while the seaming members travel around the work.

In the present application, I have shown the same construction as in the companion application, and have also shown a machine used more particularly for seaming non-circular or irregular shaped cans in which the work rotates while the seaming members are relatively stationary.

Heretofore, it has only been possible to use two opposed conical deflecting rolls in connection with machines for seaming circular shaped cans, and in which the work rotates while the seaming members are relatively stationary.

The object of the present invention is the obtension of a construction whereby said conical deflecting rolls can be used in connection with machines for seaming non-circular or irregular shaped cans, and in connection with machines in which the seaming members travel around the relatively stationary work.

The pith and core of the whole invention resides in the means for justifying the position of the conical deflecting rolls so that they are always tangent to the work to be acted upon. This improvement it is desired to cover in this application, and the claims are to be construed as covering any machine whether hand or automatic, whether the work rotates and the seaming members are relatively stationary or whether the work stands still and the seaming members travel in an orbit around the same.

Other improvements will appear as the specification proceeds.

In the drawings: Figure 1 is a vertical sectional view through the seamer head, gears for driving the same, and adjacent parts showing my invention applied to a machine in which the work is stationary and the seaming members travel in an orbit around the same. Fig. 2 is a bottom plan view of the seamer head and seaming members. Fig. 3 is a detail view of the opposed conical deflecting rolls and parts adjacent to the same. Fig. 4 is a vertical sectional view corresponding to Fig. 3 and taken on the line $x$—$x$ of the same. Fig. 5 is a bottom plan view of the opposed conical deflecting rolls and adjacent parts on an enlarged scale. Fig. 6 is a detail view of the opposed conical deflecting rolls looking in the direction of the arrow in Fig. 5. Fig. 7 is a sectional view on the line $z$—$z$ of Fig. 6. Fig. 8 is a sectional view on the line $w$—$w$ of Fig. 6. Fig. 9 is a cross section of the can to be seamed. Figs. 10, 11 and 12 show the action of the various seaming members on the seam of the can. Fig. 13 is a bottom plan view of the seamer head and seaming members showing my invention applied to the seaming of a circular can with the seaming members traveling around the same. Fig. 14 is a plan view of the opposed conical deflecting rolls showing a modification. Fig. 15 is a view in elevation of the said modification shown in Fig. 14. Fig. 16 is a vertical sectional view of the said modification. Fig. 17 is a side elevation showing my invention applied to a hand machine in which the work rotates while the seaming members are relatively stationary and adapted more specifically to seam a non-circular or irregular can. Fig. 18 is an enlarged detail view looking from the opposite side of the machine from that shown in Fig. 17. Fig. 19 is a plan view, with the upper portions of the framework cut away, of the machine shown in Fig. 17. Fig. 20 is a plan view in detail of the two opposed conical deflecting rolls and the mechanism for operating the same. Fig. 21 is a view in elevation of the parts shown in Fig. 20. Fig. 22 is a detail view looking in the direction of the arrow in Fig. 21.

Similar characters of reference indicate corresponding parts in the different views.

Referring more particularly to the construction shown in Figs. 1 to 12, 1 indicates a framework, shown only incidentally, for properly supporting the various parts of the machine.

Power is derived in any suitable way as from the countershaft 3 which imparts its motion through bevel gears 5 and 6 to the upright shaft 7 carrying the revolving seamer head 8. Located inside of the shaft 7 is a spindle 9 carrying the cam 10 and chuck 11.

The revolving seamer head 8 carries the three seaming members 12, 13 and 14 respectively. As the second seaming member embodies all the new features of construction, this will be described first and reference will be had after to the first and third.

It will be understood that in the present instance, a double motion has to be imparted to all three seaming members; namely, a motion parallel to the shape of the work to be acted upon and a motion toward and away from the said work to cause the said seaming members to move into seaming position and thereafter to withdraw from the same. In order to carry this into effect, the said seaming members are provided with a contour carrier 15 and a seaming carrier 16, one of which carries the seaming tools and is mounted upon the other carrier so that the seaming tools will partake of the motion of both carriers. In the present instance, the contour carrier 15 is pivoted on the head 8 in the usual manner. Upon the contour carrier is mounted the seaming carrier 16, which latter, in turn, carries the seaming tools. The contour carrier 15 will conveniently take the form of an arm having an extension 17 carrying the roller 18 adapted to travel in the cam 10 carried by the chuck 11. As the seamer head 8 revolves, the seaming members will be carried around with the same and will be caused to travel in an orbit around the work to be acted upon parallel to the contour of the said work and following the general contour of the said work. In the present instance, where the work is square, the cam 10 will of course have a contour substantially identical with the contour of the can or work to be acted upon. The cam 10 is of course stationary with the work to be acted upon. The seaming carrier 16 will conveniently take the form of a bell crank lever and is pivoted at 20 on the contour carrier 15. This seaming carrier carries the seaming tools which in the present instance are in the form of rolls, the second member having two opposed conical deflecting rolls. Any suitable means can of course be provided for moving the seaming carrier toward and away from the work. In the present instance, it is constructed as follows: One end of the lever or seaming carrier 16 is connected with the plunger 21 sliding in the cylinder 22 in which is located the spring 23 for yielding to any unevenness in the seam. This tube is carried by a sliding member 2 provided with an expansion spring 4 which normally tends to hold the seaming member away from the work.

Inside the contour carrier 15 is a spindle 24 carrying the pinion 25 at its upper end and the cam 19 in its lower end. This pinion 25 engages with the gear 26 moving in unison with the gear 27 meshing with the gear 28 on the upright shaft 29 which latter carries a second gear 30 engaging with the gear 31 moving with the bevel gear 6. Carried by the sliding member 2 is a roller 32 with which the cam 19 is adapted to engage to move the seaming carrier toward the work. This construction is common to all three members. The seaming carrier on the first and third seaming members carries the crimping or curling roll 33 and finishing roll 34 respectively, while the second seaming member carries two opposed conical deflecting rolls 35 and 36 respectively.

The foregoing describes the construction of the first and third seaming members. The second seaming member, however, must in addition to the above means, be provided with a mechanism for moving the conical deflecting rolls toward and away from each other at the proper moment, and further with justifying means for maintaining the said opposed conical deflecting rolls tangent to the contour of the work at the points of irregularity. These additional means will now be described.

Pivoted on the seaming carrier 16 is a straddling link 37 which carries the lower deflecting roll 36. 38 indicates a stud also mounted on the seaming carrier carrying the lower arm 39 adapted to engage with the straddling link 37. Mounted on the said stud 38 is an upper arm 40 which bears upon a portion of the contour carrier 15. When the seaming carrier moves in toward the work, the arm 40 will engage with the contour carrier 15 thereby causing the arm 39 to move the straddling link 37 and the roll 36 in an upward direction so as to move the said roll 36 up against the conical deflecting roll 35. Upon the return movement of the seaming carrier, the reverse action will take place. The seaming carrier is further provided with two justifying rollers 41 and 42 mounted eccentrically one above the other and adapted to engage with the superposed cams 43 and 44 on the chuck 11. These cams 43 and 44 being of a shape substantially parallel to the contour of the work to be acted upon, the said justifying rolls will always keep the said deflecting rolls tangent to the work to be acted upon. In case of a non-circular can, as in the present instance, it is obvious that on rounding the corner the deflecting rolls would project a distance in over the said corner thereby causing an improper operation of the machine having the result of spoiling the can. It is therefore necessary to provide means or so construct the parts that the said deflecting rolls are carried at a point on rounding the corner or at other points of irregularity where they will not project in over the same. In the present instance, this means will take the form of projecting portions 45 and 45$^a$ and 46 and 46$^a$ located at the corners or turning points of the said cams 43 and 44. The roll 41 in rounding the corner will engage with the straight projection 45 then with the rounded projection 45$^a$ while the roll 42 will engage with the rounded projection 46 and then with the straight projection 46$^a$.

In seaming a can such as is shown in Fig. 9 for instance, the said can will be properly brought into operating position on the chuck by means of a well known construction such as is shown in the companion application filed herewith and fed to the machine either by hand or otherwise. The seamer head as it rotates brings the first member carrying the curling or crimping roll into juxtaposition with the can and moves gradually in toward the said can causing the crimping or curling roll 33 to act upon the can producing the effect shown in Fig. 10. The said crimping roll 33 remains in engagement with the can during several revolutions of the seamer head 8 after which it withdraws, whereupon the two opposed conical deflecting rolls are moved in toward the can producing the effect as shown in Fig. 11. In so doing, the lower conical deflecting roll 36 will move up toward the upper roll 35 the said rolls being held tangent to the contour of the work by the justifying means as they travel in an orbit parallel to the contour of the can and will not project in over the seam unduly on turning a corner. After the said opposed conical deflecting rolls have acted upon the can during several revolutions of the seamer head 8, they are withdrawn in the manner described and the finishing roll brought into contact with the can to finish the seam as shown in Fig. 12, the movement of the said roll 34 being substantially identical to that of the roll 33. The can will then be removed in any suitable way.

It is of course obvious that the various parts are so timed as to cause the operation just described to take place in the proper manner. The words "crimping" and "curling" used to denote the first seaming roll are of course interchangeable and the claims should be construed accordingly.

In Fig. 13, I have shown my invention applied to the seaming of a circular can, the seaming members traveling around the said can while the latter is stationary. In this instance, the chuck 47 is provided with a circular cam 48 which has the effect of properly justifying the position of the conical deflecting rolls without the use of projecting portions as 45 and 45$^a$ and 46 and 46$^a$.

In Figs. 14, 15 and 16, I have shown a modification of the second seaming member. In this instance the contour carrier 78 merely serves to support the seaming carrier 79, the said seaming carrier being provided with two justifying rolls 80 and 81 engaging with the cam 82 on the chuck 83, the roll 18 being dispensed with entirely in the present instance, so that the two rolls 80 and 81 will cause the said seaming members to travel in an orbit parallel to the contour of the work and also serves to justify the position of the said conical deflecting rolls 84 and 85 by maintaining them tangent to the contour of the work. In this instance furthermore, the stud 86 which rotates in the same manner as the stud 24 carries a cam 87 adapted to rock the pivoted lever 88, the other end of which engages with the pushing pin 89, which in turn operates a second pivoted lever 90 which engages with a second pushing pin 91 which acts directly to move the lower deflecting roll into and out of contact with the upper roll 84. In this instance, the deflecting rolls are prevented from extending in over the seam unduly on turning the corner by means of the cam 102 and roller 103.

Turning now to the construction shown in Figs. 17 to 22, 105 indicates a framework of any suitable construction.

106 is a work supporter rotated by means of the bevel gears 107 and 108, the latter of which is mounted on the shaft 109 and which latter is controlled by means of the clutch 110 operated through the rod 111 and lever 112 pivoted at 113 and actuated by the foot treadle 114.

115 is a clamp for clamping the can between itself and the work supporter 106. This clamp is operated through the lever 116 connecting rod 117, bell crank 118, and cam 119 also actuated from the treadle 114. In this instance, the work supporter or chuck 106 is provided with a cam 120 on its underside in which are located the rollers 121 of the seaming members so that as the cam 120 rotates with the work, the seaming members will be steadied and guided in relation to the work. In the present instance, there are three seaming members marked respectively 122, 123, and 124. The seaming members 122 and 123 denote the curling and finishing rolls respectively both of which are mounted on a segment 125 pivoted at 126 on one side of the machine, either of said rolls 122 and 123 being brought opposite to the work or can to be seamed by means of the handle 127. The segment 125 is mounted upon a slider 128 which moves toward and away from the work; but is normally held away from the work by means of a spring 129.

130 is a cam pivoted at 131 which has one surface 132 which serves to move the slider 128 toward the work. This movement toward the work of the slider 128 is effected through the instrumentality of the hand lever 133, pivoted at 134 and adapted to move the sliding member 135 which in turn operates the crank bell 136 acting against the pushing rod 137 which latter engages with the other end 138 of the cam 130.

The two conical deflecting rolls which are denoted jointly by the number 124 are located on the other side of the machine and are stationary relatively to the work except for a movement toward and away from the work as will more fully hereinafter appear.

139 is a slider mounted on the framework and normally held away from the work by means of the spring 140 and carrying the head 141 which supports the pivot 142 upon which are mounted the two conical deflecting rolls denoted respectively 143 and 144.

145 is a pivot located at the rear of the slider 139 and provided with a segment 146 and two cams 147 and 148. The cam 148 engages with the member 149 on the slider 139 while the cam 147 engages with the roller 150 moving with the rod 151 which latter operates the bell crank 152 which in turn moves the roller 143 toward the roll 144. The spring 140 serves to return the parts to their normal position.

Engaging with the segment 146, is a rack 154 which receives its motion from the lever 155, bell crank 156, and operating handle 157. The effect of this construction is that when the handle 157 is depressed, the slider 139 moves forward and the roller 133 moves toward the roller 144 thus bringing the parts into seaming operation. In order to justify the two conical deflecting rolls 143 and 144 so as to maintain them tangent to the work to be acted upon, I provide as previously, two justifying rolls 158 and 159 adapted to engage with the cams 160 and 161 on the chuck or work supporter so as to justify the position of the said conical deflecting rolls as the work rotates. In order to prevent the said two conical deflecting rolls from extending inside the periphery of the seam, I provide projections 162 and 162ª and 163 and 163ª on the corners of the cams 160 and 161, similar to the construction with projections 45 and 45ª and 46 and 46ª previously noted.

When it is desired to seam a can, the can is placed in position on the work supporter or chuck 106 and the treadle 114 depressed thereby clamping the said can and causing the work supporter or chuck to be rotated. The roller 122 is then brought into position opposite to the work or can and the handle 133 is then depressed moving the said roller 122 into seaming operation in the manner heretofore described. After this roller has acted sufficiently long on the work, the handle 133 is released and the handle 157 is then depressed causing the slider 139 to move forward thus bringing the two conical deflecting rolls into position with relation to the can and causing also the conical roll 143 to move down against the roller 144. The justifying rolls previously described serve to properly guide and justify the position of the said conical deflecting rolls while acting upon the can. After these rolls have acted a sufficient length of time upon the can, the handle 157 is released and the roll 123 is brought opposite to the can or work by means of the handle 127 after which the operating handle 133 is again depressed bringing the said roller 123 forward into seaming relation with the can. The action of this seaming roller being finished, the seaming operation and the handle 133 is then released and the machine stopped and the can removed and another one inserted after which the operation is repeated. The brackets 170 and 171 are pivoted at 172 and 173 so as to allow the seaming members to move in and out by the action of the cam 120 and roller 121.

It will thus be seen that my invention which relates more especially to the justifying of the two conical deflecting rolls can be applied in various ways either to an automatic or hand machine or to machines in which the work rotates and the seaming members travel around the same or in which the work rotates and the seaming members are relatively stationary.

Having thus described my invention, what I claim is:

1. In a seaming machine adapted to seam non-circular or irregular shaped cans, the combination with two opposed conical deflecting rolls, and work holding means, of means for moving the said conical deflecting rolls into and out of engagement with the work, coöperative means connected to the rolls and work holding means whereby the said rolls will follow the general contour of the can, justifying means on the rolls, and provisions on the work holding means coöperating with the justifying means and located at the points of irregularity of the can adapted to maintain the said deflecting rolls tangent to the work at the said points of irregularity.

2. In a seaming machine adapted to seam non-circular or irregular shaped cans, the combination with two opposed conical deflecting rolls, and work holding means, of means for moving the two deflecting rolls toward and away from each other, means for moving the said rolls toward and away from the work, coöperative means connected to the rolls and work holding means whereby the said rolls will follow the general contour of the can, justifying means on the rolls, and provisions on the work holding means coöperating with the justifying means and located at the points of irregularity of the can adapted to maintain the said deflecting rolls tangent to the work at the said points of irregularity.

3. In a seaming machine adapted to seam non-circular or irregular shaped cans, the combination with two opposed conical deflecting rolls, and work holding means, one of which travels with relation to the other, of means for moving the said conical deflecting rolls into and out of engagement with the work, coöperative means connected to the rolls and work holding means whereby the said rolls will follow the general contour of the can, justifying means on the rolls, and provisions on the work holding means coöperating with the justifying means and located at the points of irregularity of the can adapted to maintain the said deflecting rolls tangent to the work at the said points of irregularity.

4. In a seaming machine adapted to seam non-circular or irregular shaped cans, the combination with two opposed conical deflecting rolls, and work holding means, one of which travels with relation to the other, of means for moving the two deflecting rolls toward and away from each other, means for moving the said rolls toward and away from the work, coöperative means connected to the rolls and work holding means whereby the said rolls will follow the general contour of the can, justifying means on the rolls, and provisions on the work holding means coöperating with the justifying means and located at the points of irregularity of the can adapted to maintain the said deflecting rolls tangent to the work at the said points of irregularity.

5. In a seaming machine, the combination of two opposed conical deflecting rolls, and work holding means, of means for moving the said conical deflecting rolls toward and away from the work, two justifying rolls and means coöperating therewith for justifying the position of the said conical deflecting rolls so as to maintain them tangent to the contour of the work.

6. In a seaming machine, the combination with two opposed conical deflecting rolls, and work holding means, of means for moving the two deflecting rolls toward and away from each other, means for moving the said rolls toward and away from the work, two justifying rolls and means coöperating therewith for justifying the position of the said conical deflecting rolls so as to maintain them tangent to the contour of the work.

7. In a seaming machine, the combination with two opposed conical deflecting rolls, and work holding means, one of which travels with relation to the other, of means for moving the said conical deflecting rolls toward and away from each other, two justifying rolls and means coöperating therewith for justifying the position of the said conical deflecting rolls so as to maintain them tangent to the contour of the work.

8. In a seaming machine, the combination with two opposed conical deflecting rolls, and work supporting means, one of which travels with relation to the other, of means for moving the said conical deflecting rolls toward and away from each other, means for moving the said conical deflecting rolls toward and away from the work, two justifying rolls and means coöperating therewith for justifying the position of the conical deflecting rolls so as to maintain them tangent at all times to the contour of the work.

9. In a seaming machine, the combination of two opposed conical deflecting rolls and work holding means, of means for moving the said conical deflecting rolls toward and away from each other, two justifying rolls mounted eccentric with each other, and means coöperating therewith for justifying the position of the said conical deflecting rolls so as to maintain them tangent to the contour of the work.

10. In a seaming machine, the combination with two opposed conical deflecting rolls and work holding means, of means for moving the two deflecting rolls toward and away from each other, means for moving the said rolls toward and away from the work, two justifying rolls mounted eccentric with each other and means coöperating therewith for justifying the position of the said conical deflecting rolls so as to maintain them tangent to the contour of the work.

11. In a seaming machine, the combination with two opposed conical deflecting rolls and work holding means, one of which travels with relation to the other, of means for moving the said conical deflecting rolls toward and away from each other, two justifying rolls mounted eccentric with each other, and means coöperating therewith for justifying the position of the said conical deflecting rolls so as to maintain them tangent to the contour of the work.

12. In a seaming machine, the combination with two opposed conical deflecting rolls, and work supporting means, one of which travels with relation to the other, of means for moving the said conical deflecting rolls toward and away from each other, means for moving the said conical deflecting rolls toward and away from the work, two justifying rolls mounted eccentric with each other and means coöperating therewith for justifying the position of the conical deflecting rolls so as to maintain them tangent to the contour of the work.

13. In a seaming machine adapted to seam non-circular or irregular shaped cans, the combination with two conical deflecting rolls, and work holding means, of means for moving the said rolls into and out of engagement with the work, coöperative means connected to the rolls and work holding means whereby the said deflecting rolls will follow the general contour of the can, two justifying rolls connected to the conical deflecting rolls and cams on the work holding means for engaging with the said justifying rolls whereby the said deflecting rolls are maintained tangent to the work at the points of irregularity.

14. In a seaming machine adapted to seam non-circular or irregular shaped cans, the combination with two opposed conical deflecting rolls, and work holding means, one of which travels with relation to the other, of means for moving the said rolls into and out of engagement with the work, coöperative means connected to the rolls and work holding means whereby the said deflecting rolls will follow the general contour of the can, two justifying rolls connected to the conical deflecting rolls, and cams on the work holding means for engaging with the said justifying rolls whereby the said deflecting rolls are maintained tangent to the work at the points of irregularity.

15. In a seaming machine adapted to seam non-circular or irregular shaped cans, the combination with two opposed conical deflecting rolls, and a rotating work holding means, of means for moving the said rolls into and out of engagement with the work, coöperative means connected to the rolls and work holding means whereby the said deflecting rolls will follow the general contour of the can, two justifying rolls connected to the conical deflecting rolls, and cams on the work holding means for engaging with the said justifying rolls whereby the said deflecting rolls are maintained tangent to the work at the points of irregularity.

16. In a seaming machine, the combination of a pivoted bracket, a rotating work holding means and a cam rotating with the latter, a roller, carried by the bracket, engaging with the cam, two conical deflecting rolls, a slider carrying the same, means for moving said slider toward the work and for causing the conical deflecting rolls to act on the work, and means for keeping the said conical deflecting rolls tangent to the work at all times.

17. In a seaming machine, a pivoted bracket, a rotating work holding means, a cam rotating with the same, a roller, carried by the bracket engaging with the cam, two conical deflecting rolls, a slider carrying the same, a pivoted sleeve, two cams on the said sleeve, a roller carried by the slider, engaging with one of said cams, and a roller connected to one of said conical deflecting rolls engaging with the other of said cams, a segment mounted on said sleeve, a rack engaging with the said segment, and two justifying rolls, and means moving with the work supporter, mounted eccentric with relation to each other for keeping the conical deflecting rolls tangent to the work at all times.

18. In a seaming machine adapted to seam non-circular or irregular shaped cans, the combination with two conical deflecting rolls, and work holding means, of means for moving the said rolls into and out of engagement with the work, coöperative means connected to the rolls and work holding means whereby the said deflecting rolls will follow the general contour of the can, two justifying rolls connected to the conical deflecting rolls and mounted eccentrically one above the other, and two superposed cams on the work holding means for engaging with the said justifying rolls whereby the said deflecting rolls are maintained tangent to the work at the points of irregularity.

19. In a seaming machine adapted to seam non-circular or irregular shaped cans, the combination with two opposed conical deflecting rolls, and work holding means, one of which travels with relation to the other, of means for moving the said rolls into and out of engagement with the work, coöperative means connected to the rolls and work holding means whereby the said deflecting rolls will follow the general contour of the can, two justifying rolls connected to the conical deflecting rolls and mounted eccentrically one above the other, and two superposed cams on the work holding means for engaging with the said justifying rolls whereby the said deflecting rolls are maintianed tangent to the work at the points of irregularity.

20. In a seaming machine adapted to seam non-circular or irregular shaped cans, the combination with two opposed conical deflecting rolls, and a rotating work holding means, of means for moving the said rolls into and out of engagement with the work, coöperative means connected to the rolls and work holding means whereby the said deflecting rolls will follow the general contour of the can, two justifying rolls connected to the conical deflecting rolls and mounted eccentrically one above the other, and two superposed cams on the work holding means for engaging with the said justifying rolls whereby the said deflecting rolls are maintained tangent to the work at the points of irregularity.

Signed at New York, N. Y. this 12th day of December 1903.

OTTO S. BEYER.

Witnesses:
AXEL V. BEEKEN,
E. H. TUCKER.